Oct. 30, 1951   R. M. SHAW, JR   2,572,826
FOOD PRESERVING AND COOKING DEVICE
Filed Jan. 31, 1948
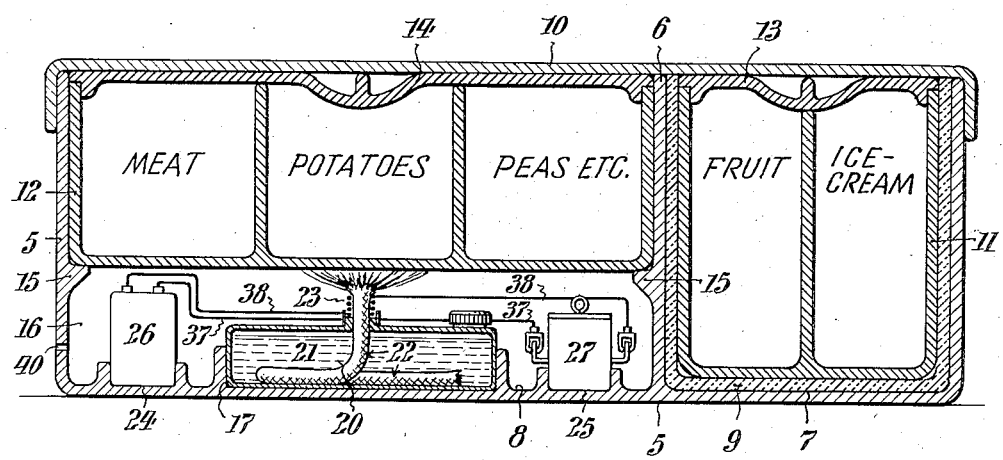
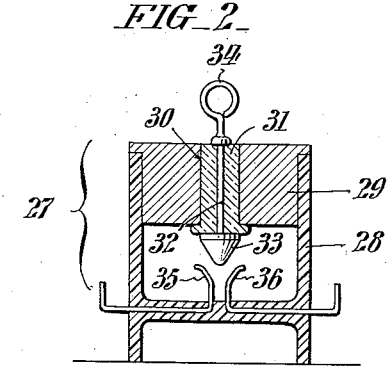
WITNESSES
Hubert Fuchs
A. J. Brittingham
INVENTOR:
Ralph M. Shaw, Jr.,
BY Paul & Paul
ATTORNEYS.

Patented Oct. 30, 1951

2,572,826

UNITED STATES PATENT OFFICE 2,572,826

FOOD PRESERVING AND COOKING DEVICE

Ralph M. Shaw, Jr., Edgewater Park, N. J., assignor to Pedrick Tool & Machine Company, Philadelphia, Pa., a corporation of Pennsylvania Application January 31, 1948, Serial No. 5,669

3 Claims. (Cl. 126—261)

This invention relates to food preserving and cooking devices, that is to say, to devices into which different foods essential to a complete balanced meal for one or more persons can be packed for preservation in a refrigerator until their use is desired and in which the foods are later cooked before removal.

In connection with a device of the kind referred to I aim to provide for automatic cooking of the raw contents after removal of the device from the refrigerator. This desideratum is attained in practice, as hereinafter more fully disclosed, by embodiment in the device, of a heating unit and thermostatic control which is normally dormant at the temperature maintained in the refrigerator, but which, upon removal of the device from the refrigerator and exposure for a definite time to room temperature, automatically starts operation of the heating means for cooking the raw foods, those of the foods which it is desired to keep cold being protected from the influence of the heat during the cooking period by thermal insulation incorporated in the container structure.

Other objects and attendant advantages will appear from the following detailed description of the attached drawings, wherein Fig. 1 shows, in vertical section, a food preserving and cooking device conveniently embodying my invention; and wherein Fig. 2 is a detail view in section on a larger scale of the thermostatic device which controls starting of the cooking after the device is removed from the refrigerator.

As herein delineated, my improved food preserving and cooking device comprises a box like main receptacle 5 which may be of glass, metal, plastic or any other suitable heat resistant material with a transverse partition 6, setting apart two compartments 7 and 8 whereof the latter has a lining 9 of thermal insulation, and with a cover 10. Fitting into the chambers 7 and 8 of the main receptacle 5 are individually removable insert receptacles 11 and 12 similarly of heat resistant material with separate covers 13 and 14. The insert receptacle 11 may have two subdivisions respectively for prepared desserts like ice cream and fruit for example, and the insert receptacle 12 three subdivisions respectively for raw or uncooked foods such as meat, potatoes and peas, as indicated in Fig. 1. The insert receptacle 12 is considerably shallower than the main receptacle 5 and arranged to be supported on ledges 15, with resultant provision of a clear space or hollow 16 therebeneath within the compartment 8.

Disposed in the hollow 16 and removably set into a recess 17 at the bottom of the main receptacle 5 is a heating means 20 in the form of a burner consisting of a reservoir 21 for liquid fuel such as alcohol or gasoline, and having an upwardly protruding burner wick 22 which is surrounded by an igniting coil 23 of high resistance. Also removably placed respectively in other recesses 24 and 25 in the bottom of the compartment 8 are a small dry cell 26 and a thermostatic means 27. As best shown in Fig. 2, the thermostatic means 27 has a cup-like body 28 which, in practice, is made of a suitable electric insulating material such as glass or plastic, and in the top of which is lodged a stopper-like element 29 of heat conductive material such as copper or the like. Lodged in the axial bore 30 of element 29 is a plug 31 of glass or other insulation, through the center of which a metal rod 32 passes, said rod having a conical contact head 33 at its lower end and a grasp 34 at its upper protruding end. Within the bottom of the body 28 is a pair of upstanding contact tongues 35 and 36 one of which (see Fig. 1) is connected by a conductor 37 to one terminal of the battery 26, and the other of which is connected, with interposition of the igniting coil 23 of the heating device 20, by a conductor 38 to the other terminal of said battery. At the temperature normally maintained in a refrigerator the element 29 is contracted upon the plug 31 and holds the latter in the raised position in which it is shown in Fig. 2.

In use, the device is packed with foods of the kind mentioned and placed in the refrigerator where it is to be ordinarily kept. When the food is to be used, the packed device is removed from the refrigerator and allowed to stand in any convenient place for subjection to room temperature. Under the influence of this higher temperature, the copper element 29 of the thermostatic means 27 eventually expands, and, in so doing, releases the plug 31 which will thereupon drop by gravity into engagement with the contacts 35 and 36 and close the electric circuit through the coil 23 with consequent ignition of the wick 22 of the burner 20 to cook the contents of the insert receptacle 12. The insulation lining 9 in the compartment 7 of the main receptacle 5 serves to protect the fruit and the ice cream from the influence of the burner heat during the cooking. Sufficient air to support combustion enters the chamber 16 by way of inlet apertures 40 in the side wall of the main receptacle 5. In practice the thermostatic means 27 is so designed as to become operative after exposure of the device for about three and a half hours at room temperature, and the burner 20 to operate for a period of approximately one half hour before exhaustion of the fuel supply in the reservoir 21, so that the cooked food will be ready for consumption in approximately four hours from the time of removal of the device from the refrigerator. However, the thermostatic means may be modified to suit the demands of service as may be desired. After each use of the device, the thermostatic means 27 is taken from the receptacle 5, the plug 31 lifted by the grasp 34, and said means placed in the refrigerator until the element 29 is sufficiently contracted to re-grasp said plug. The parts may thereupon be reassembled and the device re-packed with food and again placed in the refrigerator.

From the foregoing, it will be seen that my improved food preserving and cooking device is not only advantageous for use in the home, but that it may be employed as a food carrier for workers, as well as for picnic purposes, and for use in aircraft where hot meals are particularly advantageous for health purposes.

Having thus described my invention, I claim:

1. In a food preserving and cooking device, a receptacle for frozen foods having a hollow therebeneath; heating means within said hollow having the form of a wick burner with a fuel reservoir of a capacity to insure complete cooking of the food in the receptacle; an electrical igniting means at the wick of the burner; and a normally-open thermostatic switch in circuit with the igniting means adapted, upon rise of the temperature within the receptacle to a predetermined degree after removal from storage in a refrigerator, to close the circuit for starting the burner.

2. A food preserving and cooking device according to claim 1, wherein the igniting means is in the form of a resistance coil surrounding the exposed portion of the burner wick.

3. A food preserving and cooking device according to claim 1, wherein the thermostatic switch comprises a pair of spaced contacts, and a contact bridging element, and thermally-responsive means for holding the element normally suspended above said contacts operative, upon rise of the temperature at said thermally responsive means to release said element to close the circuit.

RALPH M. SHAW, JR.

REFERENCES CITED

The following references are of record in the file of this patent:

UNITED STATES PATENTS

| Number | Name | Date |
|---|---|---|
| 195,050 | Russell | Sept. 11, 1877 |
| 724,547 | Cooke | Apr. 7, 1903 |
| 790,612 | Boniface | May 23, 1905 |
| 909,252 | Straub et al. | Jan. 12, 1909 |
| 1,292,414 | Ahearn | Jan. 28, 1919 |
| 1,336,776 | Drinkwater | Apr. 13, 1920 |
| 1,716,367 | Clayton | June 11, 1929 |
| 1,858,294 | Devine | May 17, 1932 |
| 1,979,222 | Goodwin | Oct. 30, 1934 |
| 2,138,706 | Myers | Nov. 29, 1938 |
| 2,187,196 | Douglass | Jan. 16, 1940 |

FOREIGN PATENTS

| Number | Country | Date |
|---|---|---|
| 19,665 | Great Britain | 1908 |